March 10, 1953  R. C. HORNE ET AL  2,630,983
AERIAL CAMERA MOUNT AND CONTROL MEANS THEREFOR
Filed Feb. 8, 1951  5 Sheets-Sheet 1

INVENTORS.
Richard C. Horne
Morris L. Roth
Fred N. Dickerman

BY
Attorney

March 10, 1953　　　R. C. HORNE ET AL　　　2,630,983
AERIAL CAMERA MOUNT AND CONTROL MEANS THEREFOR
Filed Feb. 8, 1951　　　　　　　　　　　　　　5 Sheets-Sheet 2
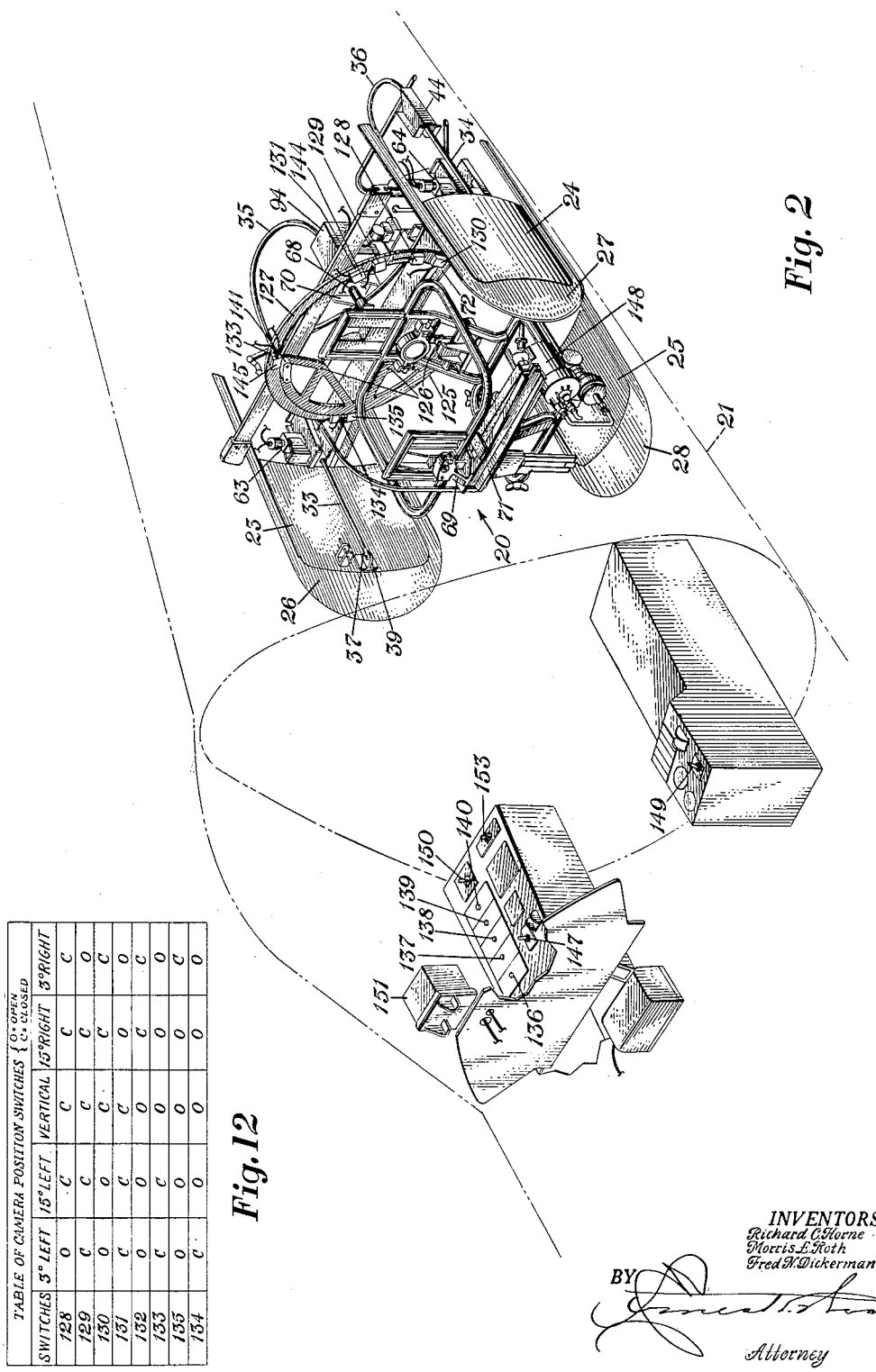
Fig. 2
Fig. 12
| TABLE OF CAMERA POSITION SWITCHES {O=OPEN C=CLOSED} | | | | | |
|---|---|---|---|---|---|
| SWITCHES | 3° LEFT | 15° LEFT | VERTICAL | 15° RIGHT | 3° RIGHT |
| 128 | O | C | C | C | C |
| 129 | O | O | C | C | C |
| 130 | C | O | O | C | C |
| 131 | C | C | O | O | C |
| 132 | C | C | C | O | O |
| 133 | O | C | C | C | O |
| 135 | O | O | C | O | C |
| 134 | C | O | C | C | O |
INVENTORS.
Richard C. Horne
Morris E. Roth
Fred N. Dickerman
BY 
Attorney

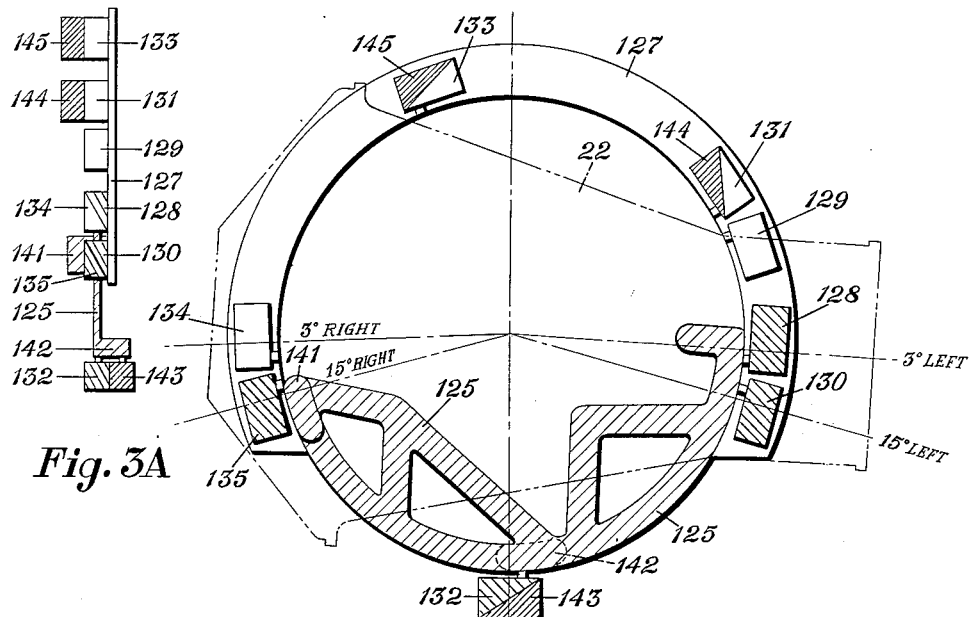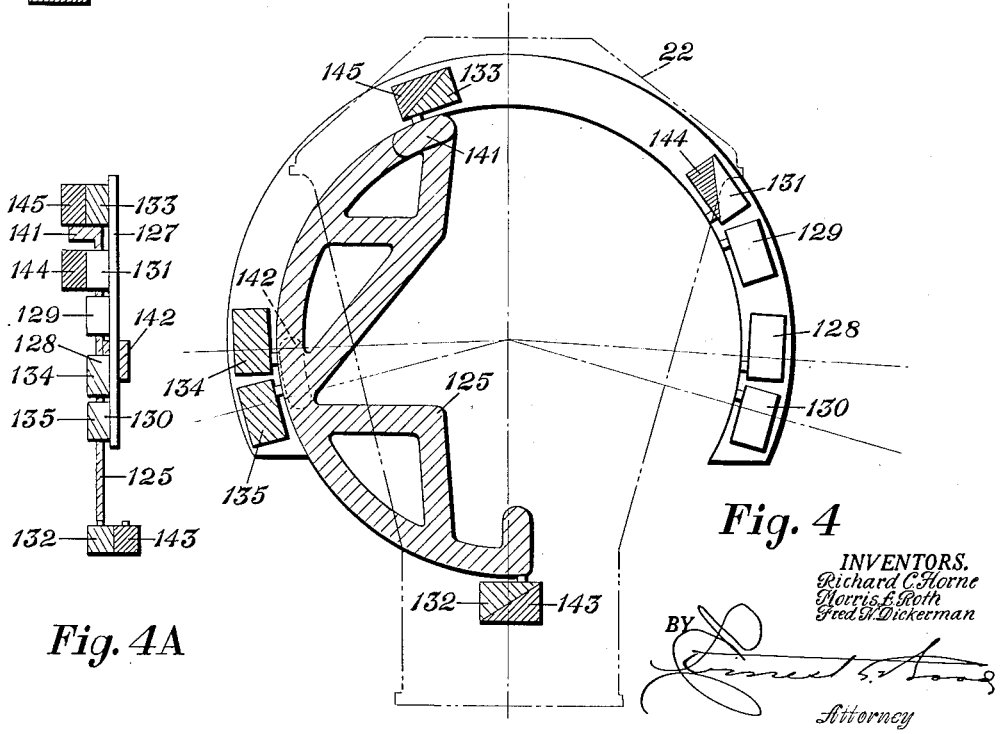

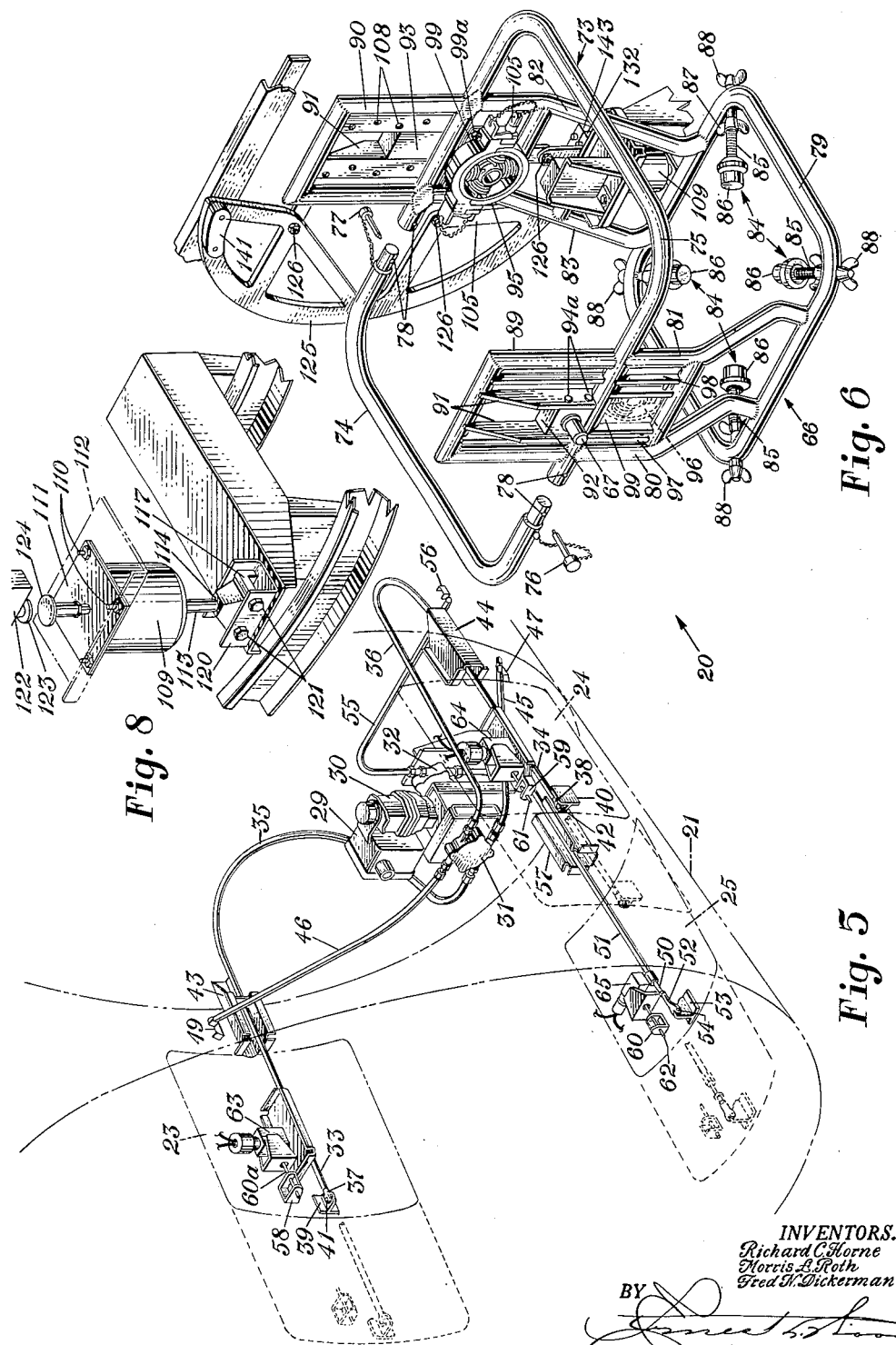

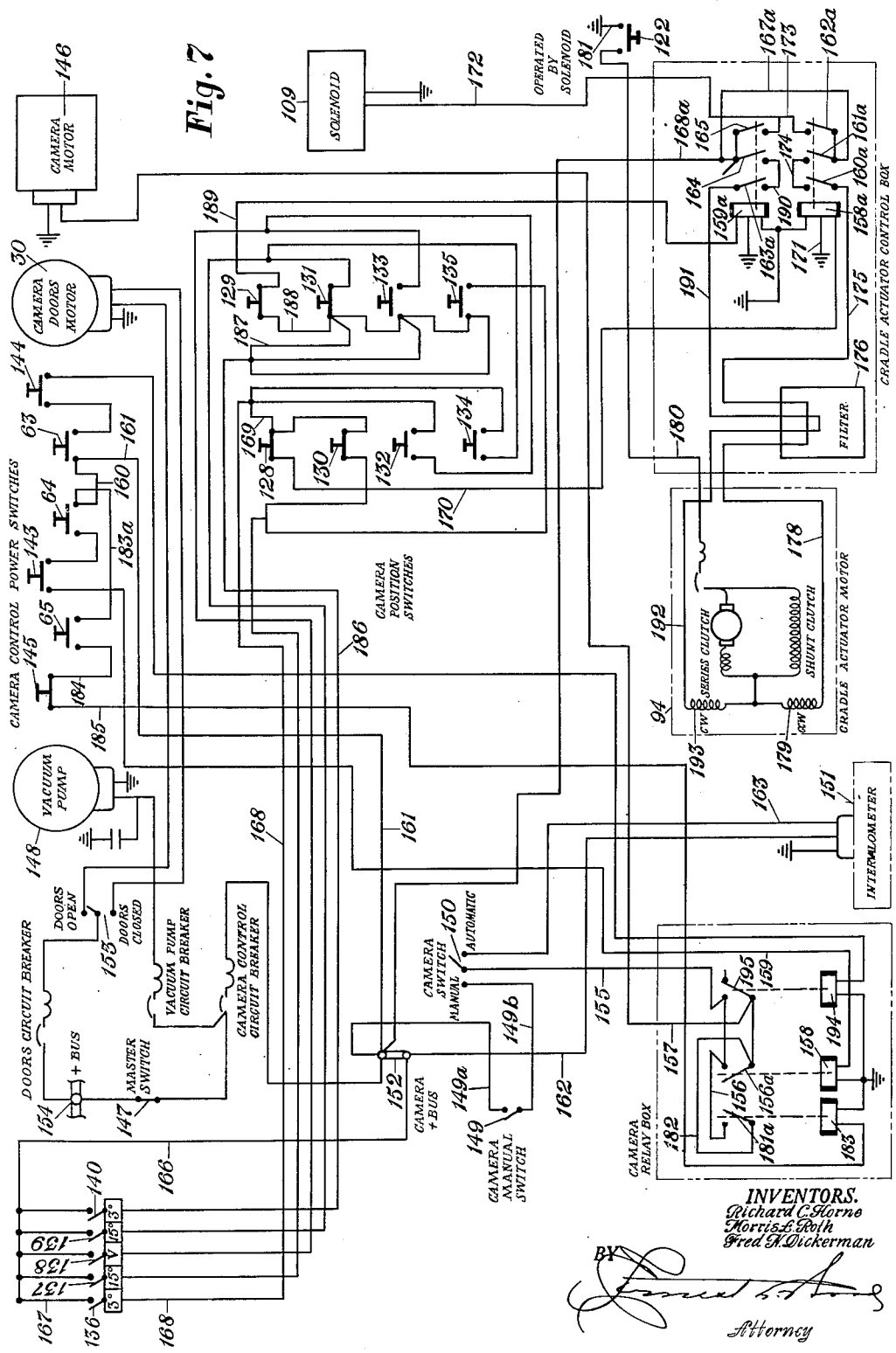

Patented Mar. 10, 1953

2,630,983

UNITED STATES PATENT OFFICE 2,630,983

AERIAL CAMERA MOUNT AND CONTROL MEANS THEREFOR

Richard C. Horne, Morris E. Roth, and Fred N. Dickerman, Dallas, Tex., assignors to United Aircraft Corporation, East Hartford, Conn., a corporation of Delaware Application February 8, 1951, Serial No. 210,072

10 Claims. (Cl. 244—1)

This invention relates to aerial photographic apparatus and more particularly to an automatically controlled camera mount for an airplane for supporting a camera in any selected position of several predetermined positions and the control means therefor.

An object of this invention is to provide a camera mount for an airplane which will enable the camera to be positioned in a pre-selected position to take pictures from a desired angle.

Another object is to provide a camera mount for an airplane which can be controlled from a remote point to position a camera in any selected position of several predetermined positions to enable the camera to take pictures from a pre-selected angle.

A further object is to provide control means for the doors which cover apertures in the body of an aircraft through which pictures are taken by a camera and for the camera and its mount which will allow the camera to operate only when the camera is in a selected one of several predetermined positions and facing an open aperture in the body of the aircraft.

Briefly stated, the aerial photographic apparatus of the invention is usually employed in a high speed airplane in order to secure a series of pictures taken from any of several predetermined angles. The apparatus comprises a cradle rotatably mounted in the body or fuselage of an airplane adjacent apertures, closed by slidable doors, provided in the fuselage and through which pictures are to be taken. The cradle is provided with means for securing a camera therein. Electrical controls are provided by means of which the doors, the cradle and the camera may be operated from a point in the aircraft remote from the camera in order that pictures may be taken by the camera through any selected aperture in the fuselage from any one of several predetermined angles.

For a better understanding of the invention reference may be had to the following description taken in connection with the accompanying drawings and its scope will be pointed out in the appended claims.

In the drawings:

Figure 2 is a perspective view of the camera mount and the sliding doors together with their associated operating mechanisms shown in position in an aircraft fuselage, which is drawn in phantom, together with remote controls positioned in a forward portion of the fuselage;

Figure 3 is a diagrammatic view of a portion of the camera mount operating mechanism and showing the camera drawn in phantom, in a left 3° below horizontal position;

Figure 3A is a diagrammatic chart showing the microswitches which are contacted by the master cam and the auxiliary cams when the camera is in a left 3° below horizontal position;

Figure 4 is a diagrammatic illustration of the mechanism shown in Figure 3 showing the camera in a vertical position;

Figure 4A is a diagrammatic chart showing the microswitches which are contacted by the master cam and auxiliary cams when the camera is in a vertical position;

Figure 5 is a perspective view showing the door operating mechanism;

Figure 6 is a perspective view of the cradle assembly;

Figure 7 is a diagrammatic illustration of the electrical circuits for controlling the door, camera, and cradle operating mechanisms;

Figure 8 is an enlarged perspective view of a portion of the cradle operating mechanism;

Figure 12 is a chart showing the open and closed positions of microswitches relative to each of the predetermined camera positions.

Figure 1:
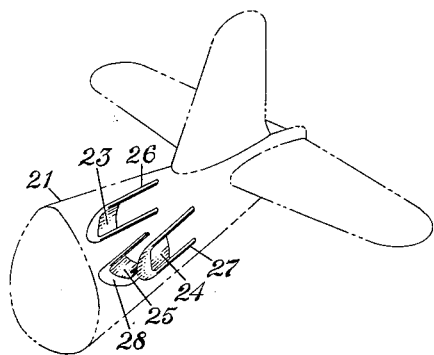
Figure 1 is a perspective view of the aft portion of an airplane fuselage, drawn in phantom, showing the sliding doors for the apertures through which photographs are taken by a camera mounted within the fuselage.
Figure 10:
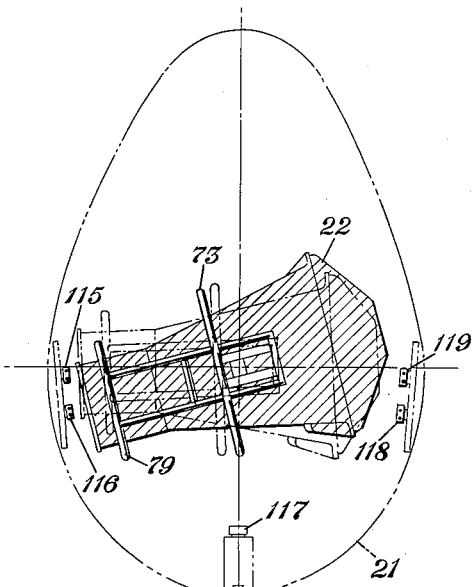
Figure 10 is a diagrammatic illustration of the camera including the serrated brace pads at the positions which the camera cradle may assume.

In the drawing, the camera mount, indicated generally by the reference character 20, is shown installed in the aft portion of the fuselage 21 of an airplane adjacent and between three apertures provided in the sides and bottom of the fuselage. The camera mount is adapted to hold a camera 22 and rotate it to predetermined positions in which the camera may take photographs from different angles.

The apertures in the fuselage are closed by sliding side doors 23 and 24 and a bottom door 25 which are slidably mounted in conventional door mounting assemblies 26, 27 and 28, respectively, which are rigidly secured to the fuselage. The doors are opened and closed by an electric motor 29. The electric motor 29 drives a reduction gear assembly 30 which in turn simultaneously drives two cable driving gear assemblies 31 and 32. The cable driving gear assembly 31 drives a pair of cables 33 and 34 which extend through conduits 35 and 36 and have ends provided with clevises 37 and 38, respectively, which are secured to lugs 39 and 40 on the side doors 23 and 24 by means of pins 41 and 42, respectively. The conduits 35 and 36 are supported by brackets 43 and 44, respectively, rigidly secured to the sides of the fuselage. The free ends of the cables 33 and 34 extend through conduits 45 and 46, respectively, which are secured to the fuselage by brackets 47 and 48, respectively. The conduits 45 and 46 are provided to constrain the free ends of the cables 33 and 34 and prevent them from contacting other components of the mechanism. It will be apparent that when the electric motor 29 is driven in one direction the cables 33 and 34 will slide doors 23 and 24 open and that when it is driven in the other direction the cables 33 and 34 will slide the doors to close the side apertures in the fuselage.

The bottom door 25 is actuated by a similar cable 50 which extends through a conduit 51 and is driven by the cable driving gear assembly 32. The cable 50 has an end provided with a clevis 52 which is secured to a lug 53 on the bottom door 25 by a pin 54. The free end of cable 50 extends into the conduit 55 which is secured to the fuselage by a bracket 56. The conduit 51 is supported by a bracket 57 similar to brackets 43 and 44. The cable 50 is so connected to gear driving assembly 32 that it will operate simultaneously with cables 33 and 34 to open or close bottom door 25 when the side doors 23 and 24 are opened and closed. All three doors, therefore, will open simultaneously and close simultaneously.

The doors 23, 24 and 25 are provided with brackets 58, 59 and 60 which support actuator pins 60a, 61 and 62, respectively, which actuate microswitches 63, 64 and 65 when the doors are in fully open position. The door actuated microswitches 63, 64 and 65 prevent operation of the camera unless the door for closing the aperture to which the camera is pointed is fully open.

A camera cradle 66 is rotatably mounted between and adjacent the doors 23, 24 and 25 for rotary movement about an axis parallel to the fore and aft axis of the fuselage by means of trunnions 67 and 68 which are supported by fittings 69 and 70, respectively, rigidly secured to fixed structures, such as the cross members 71 and 72, which in this manner support the cradle 66. The cradle may be of welded construction having an upper substantially rectangular frame 73 having a detachable end portion 74 secured to a fixed portion 75 by pins 76 and 77 which extend through registering apertures 78 in telescoping ends of the end portion 74 and the fixed portion 75.

A lower substantially rectangular frame 79, which is smaller than upper frame 73, is rigidly secured to the upper frame by connecting members 80, 81, 82 and 83. The lower frame is provided with four camera braces 84 which extend inwardly from the lower frame 79. Each of the camera braces 84 comprises a threaded rod 85 to one end of which is secured a resilient pad 86. The other end of each of the rods 85 extends through a suitable aperture in the lower frame 79 and is secured to the frame by nuts 87 and 88 disposed on opposite sides of the lower frame.

A pair of inverted U-shaped members 89 and 90 are rigidly secured to the fixed portion 75 of the upper frame 73 and each is provided with a pair of vertical flanges 91 between and to which the trunnion blocks 92 and 93 of trunnions 67 and 68, respectively, are rigidly secured by means of bolts, such as the bolts 94a of trunnion block 92. The end of trunnion 68 is half-round in shape and is engaged by the half-round end of the driving shaft of the cradle motor 94 which rotates the cradle 66 about the trunnions 67 and 68.

Figure 11:
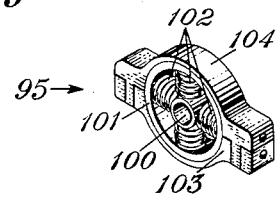
Figure 11 is an enlarged perspective view of a portion of the cradle assembly.
Figure 9:
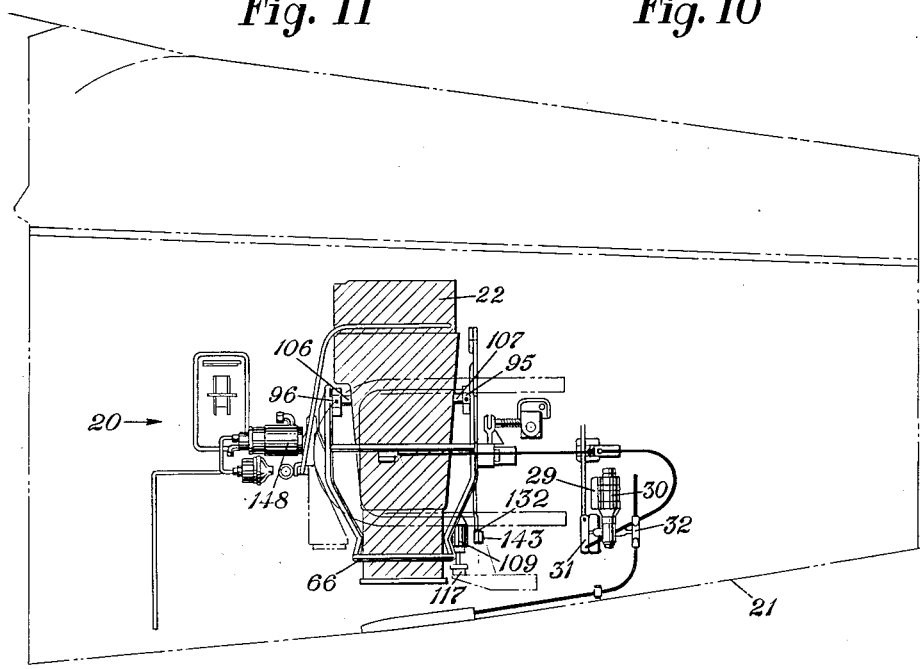
Figure 9 is a side elevation showing the camera and its operating mechanism.

In order to mount a conventional aerial camera in the cradle against vibration and shock, a pair of shock absorber assemblies 95 and 96 are provided. The lower portion of the shock absorbers 95 and 96 are rigidly secured, as by welding, to flat plates 99 which are secured to the riser members 97 and 98 of frame 73 by means of bolts such as bolts 99a of the shock absorber assembly 95. As seen best in Fig. 11, each of the shock absorber assemblies includes a bushing 100 mounted within a ring 101 by a plurality of springs 102 which is detachably secured in a split mounting housing having a lower portion 103 and an upper portion 104 which may be secured together by pins 105 which pass through registering apertures in overlapping extensions of the housing portions. The lower portion 103 of the housing is rigidly secured to the plate 99. The bushings 100 receive the trunnions 106 and 107 of the camera 22 (Fig. 9), which is therefore yieldably supported by the springs 102.

In installing a camera 22 in the cradle 66, the pins 76, 77 are withdrawn and the end portion 74 of the upper frame 73 is detached. The pins 105 of the shock absorber assemblies are also withdrawn and the upper portion 104 of the mounting housing is detached from the lower portion 103 and the rings 101 are removed and placed on the trunnions 106 and 107 of the camera. The camera is then placed within the upper and lower frames 73 and 79 and the rings 101 are positioned in the lower portions 103 of the housing and the upper portions 104 are replaced and secured to the lower portions by inserting the pins 105 through the registering apertures in the overlapping extensions of the upper and lower housing portions. The end frame portion 74 is then replaced and locked in position by the pins 76 and 77. The camera braces 84 are then adjusted by manipulation of the nuts 87 and 88 to press the pads 86 against the camera and hold it firmly but resiliently in place in the cradle 66.

The positions of the shock absorber assemblies 95 and 96 can be moved to accommodate cameras of different sizes since the supporting riser members 97 and 98 are provided with a plurality of apertures 108 through which the bolts 99a, which secure the plates 99 to the cradle, may extend.

A locking solenoid 109 is mounted on the cradle 66 by means of bolts 110 which extend through registering apertures in the solenoid plate 111 and a bracket 112 rigidly secured to the cradle 66. The spring-loaded solenoid plunger 113 is provided with a foot 114 which is adapted to engage any one of five serrated brace pads 115, 116, 117, 118 and 119 rigidly secured to the fuselage by brackets 120 and bolts 121. When the solenoid 109 is deenergized, the plunger 113 is biased by its spring toward one of the brace pads which its foot 114 firmly engages and locks the carriage 66 against rotary movement about its trunnions 67 and 68. When the solenoid 109 is energized, the plunger is retracted and the carriage is free to rotate. In order to ensure that the cradle motor 94 is never energized unless plunger 113 is in retracted position, a microswitch 122 is rigidly secured to the carriage 66 and has a pin 123 which is actuated by the button 124 on the upper end of the plunger 113 only when the plunger is in retracted position. Actuation of pin 123 closes the microswitch 122 to allow energization of the cradle motor 94.

In order to allow the cradle 66 to be rotated by the motor 94 into any selected one of five predetermined positions and to permit the cradle motor 94 to be controlled from a point in the airplane remote from the cradle, an arcuate master cam 125 is rigidly secured to the cradle by three bolts 126. An arcuate yoke 127 is fixed to the fuselage and is concentric with, and of greater radius than, the master cam 125.

The master cam is adapted to open a plurality of position microswitches 128, 129, 130 and 131 and close a plurality of microswitches 133, 134 and 135 mounted on the yoke 127 and a microswitch 132 mounted on the fuselage and which control the operation of the cradle motor 94 to rotate the cradle to any one of five predetermined positions which are selected by closing one of the switches 136, 137, 138, 139 or 140 located in the control position, such as the cockpit of the airplane. The master cam has a pair of auxiliary cams 141 and 142 which are adapted to close the microswitches 143, 144 and 145 which control the operation of the camera motor 146. The camera motor is indicated only in Fig. 7 since it is located in the conventional camera 22.

The manner of operation of the cradle 66 and the various control circuits will now be described. The various switches and relays are shown in Fig. 7 in the positions they occupy when the cradle 66 is in a vertical position; the switches contacted by the master cam 125 and auxiliary cam 141 when the camera is in the vertical position being clearly shown in Fig. 4A. Starting with the cradle in the vertical position (see Fig. 4), and the doors 23, 24 and 25 closed and the master switch 147 also closed, the vacuum pump 148 of a vacuum system employed to hold film against the vacuum back in the camera magazine will be the only operating element of the apparatus. The vacuum system is not described in detail since such systems are old and well known in the art. If the camera manual switch 149 is closed, and the selective camera switch 150 is moved either to the left (Fig. 7) to the manual operation position or to the right to the automatic operation position in which the intervalometer 151 will periodically connect the selective camera switch 150 to the bus bar 152, the camera motor will not operate even though the microswitch 145 is closed by the auxiliary cam 141, since the microswitch 65 is open. If the door master switch 153 is now moved to the upper position it connects the door motor 30 to bus 154 and the door motor runs in such direction that the doors 23, 24 and 25 are opened. When the doors reach their fully open positions, the microswitches 63, 64 and 65 are closed by the actuating pins on the doors. If the selective camera switch 150 is now moved to the left hand position (Fig. 7) the camera motor 146 will be connected to bus 152 through conductor 149a, manual switch 149, conductor 149b, selective camera switch 150, conductor 155, conductor 156, relay contact 181a, conductor 182 and conductor 157. Relay contact 181a will be in its actuated, closed, position since its relay winding 183 will be connected to bus 152 through conductor 185, microswitch 145, conductor 184, microswitch 65, conductors 183a, 160 and 161. The camera motor 30 will now operate and the camera 20 will take pictures through the aperture closed by bottom door 25. If the camera selective switch 150 is moved to the right hand position, the camera motor will be connected to bus 152 through the intervalometer 151 which will connect the camera motor 146 to the bus 152 periodically through conductors 162 and 163, switch 150, conductor 155, conductor 156, relay contact 181a, conductor 182 and conductor 157. Intervalometers are well known in the art and intervalometer 151 will therefore not be described in detail.

The cradle motor 94 will be inoperative since the microswitches 128 to 135 are in such positions that neither the relay winding 158a nor the relay winding 159a of a cradle actuator motor control is energized to actuate their contacts 160a, 161a and 162a and 163a, 164 and 165, respectively, and connect the cradle motor 94 and the locking solenoid 109 to the bus 152.

If it then be desired to take pictures through the aperture closed by side door 24 with the camera tilted at a three degree angle from the horizontal, as shown in Fig. 3, the switch 136 is closed to connect the relay winding 158a to bus 152 through conductors 166 and 167, switch 136, conductors 168 and 169, microswitch 128 and conductor 170. The other side of the relay winding 158a is connected to ground through the conductor 171. The relay winding 158a being energized, the contacts 160a, 161a and 162a are moved to their actuated positions. Locking solenoid 109 will then be connected to bus 152 through conductors 172 and 173, contact 162a and conductors 167a and 168a and will retract its plunger 113. Foot 114 will then release its contact with brace pad 117 and the cradle 66 will be free to rotate about its trunnions 67 and 68. When plunger 113 is retracted the button 124 secured to its upper end actuates the microswitch 122 which then connects the cradle motor 94 to bus 152 through conductors 168a and 167a, contact 161a, conductor 174, contact 160a, conductor 175, a filter 176 for suppressing radio noise generated in the motor 94, the conductor 178, the series winding 179 which causes counterclockwise rotation of the cradle 66 and master cam 125 as viewed in Figures 3 and 4, conductor 180, and switch 122. The other side of the switch 122 is connected to ground through a conductor 181. The cradle motor 94 will now rotate in a counterclockwise manner until the master cam 125 operates the microswitch 128. The position of master cam 125 when in contact with switch 128 is clearly shown in Fig. 3A. The relay winding 158a will then become de-energized, contacts 160a, 161a, and 162a will return to their open or non-actuated positions, motor 94 will be disconnected from bus bar 152 and will stop, and the locking solenoid 109 will also be disconnected from the bus 152. The plunger 113 will then be pushed out since it is spring-loaded and its foot 114 will contact the pad 119 to lock cradle 66 against further rotation. Switch 122 will also open to protect the apparatus from accidental operation of cradle motor 94.

The microswitch 135 will now be closed by the auxiliary cam 142 on the master cam 125 and the camera motor 146 will be connected to the bus bar 152, when selective switch 150 is in its left hand position, through conductor 149a, manual camera switch 149, conductor 149b, selective switch 150, conductor 155, relay contact 156a, and conductor 157. The relay contact 156a is actuated to closed position by the relay winding 158 which is connected to bus 152 by the conductors 161 and 160, microswitches 64 and 143, and the conductor 159. Camera 22 can now, therefore, be operated to take pictures through the aperture closed by the side door 24.

If it now be desired to move the camera to a position in which it will take photographs through the aperture closed by the other side door 23, at an angle of three degrees from the horizontal, switch 140 is closed to connect the relay winding 159a to bus 152 through the conductor 166, switch 140, conductors 186, 187 and 188, the microswitch 129 and the conductor 189. The relay winding 159a being energized, the contacts 163a, 164 and 165 are moved to their actuated positions. Locking solenoid 109 will then be connected to bus 152 through the contact 165 and will retract its plunger 113, to permit rotation of the cradle 66. The microswitch 122 will then connect the cradle motor 94 to bus 152 through conductor 168a, contact 164, conductor 190, contact 163a, conductor 191, the filter 176, conductor 192, and the series winding 193 which causes clockwise rotation of the motor 94, conductor 180, switch 122 and the conductor 181. The cradle will then be rotated until the switch 129 is opened by the master cam 125. The relay winding 159a is then de-energized and the cradle motor 94 stops rotating. Simultaneously, plunger 113 is released and its foot 114 contacts the pad 115 to prevent further movement of the cradle and the camera. Microswitch 144 will then be closed and will energize the relay winding 194, when microswitch 63 is closed, to actuate the contact 195 to then permit the camera motor to be connected to the bus 152.

The camera can be stopped at five predetermined positions by the control circuit illustrated and described. The positions of the switches 123 to 135 in each of the five positions is indicated in the chart shown in Figure 12. Tracing of various circuits for each of the five positions is deemed unnecessary since the circuits can be easily traced by those skilled in the art. It will be evident that a camera mount and control circuits have been provided for operating a camera and its mount from a position remote from the camera which enables the camera to be rotated to a plurality of predetermined positions by merely pushing a selected button or switch. The ease and simplicity of operation, and the provision of protective circuits which prevent operation of the cradle motor and of the camera motor unless other elements of the apparatus are in their proper positions are among the chief advantages of the invention.

While a preferred embodiment of the invention has been set forth, it is not desired to be limited to the specific structure except as set forth in the appended claims, and it is further understood that modifications may be made without departing from the scope of the claims.

What is desired to be secured by claims is:

1. In an airplane, a mounting arrangement for a camera comprising a mounting cradle pivoted to the structure of the airplane, means on said cradle for supporting and positioning said camera therein, cam means attached to said cradle and rotated therewith, a yoke fastened to the airplane including position switches supported thereon and adapted to be actuated by said cam means for arresting said cradle at predetermined positions, and a plunger carried by said cradle and governed by said position switches adapted to engage the airplane structure to lock said cradle in said predetermined positions.

2. In an aircraft, a mounting arrangement for an aerial camera comprising a mounting cradle pivoted to the structure of the aircraft, means for rotating said cradle on fixed structure of said aircraft, cam means adapted to be rotated with said cradle, a plurality of electrical position switches mounted on the aircraft and adapted to be contacted by said cam means, manually operable means for energizing said means for rotating said cradle through a selected position switch de-energizing said means for rotating said cradle when said cam means contacts said selected position switch, and a solenoid-operated brace attached to said cradle and governed by the de-energization of said means for rotating said cradle for locking said cradle at a predetermined position.

3. In an aircraft having a fuselage provided with a plurality of apertures; a cover for each of said apertures; a motor for moving said covers into open and closed positions; a cradle rotatably supported in said fuselage adjacent said apertures, said cradle being adapted to support a camera; a motor for rotating said cradle; electrically controlled means operatively associated with said cradle motor for rotating said cradle to a selected position of a plurality of predetermined positions; and means operatively associated with said electrically controlled means and said cradle motor preventing rotation of said cradle while said apertures are closed.

4. In combination; an airplane having a fuselage provided with a plurality of apertures arranged about the longitudinal axis of said fuselage; a cover for each of said apertures; an electrically controlled means operatively associated with said covers for closing said apertures; a cradle mounted in said fuselage adjacent said apertures for rotary movement about an axis substantially parallel to said longitudinal axis, said cradle being adapted to support a camera; a motor for rotating said cradle; means for preventing energization of said motor while said apertures are closed; electrically controlled means for locking said cradle against movement; a plurality of switch means operatively associated with said locking means and said motor, each of said switch means when actuated unlocking said cradle to permit rotary movement of said cradle and starting said motor; and a plurality of switches secured to said fuselage adjacent said cradle, each of said switches being operatively associated with one of said switch means to stop said motor at a predetermined position, said plurality of switch means being adapted to rotate said cradle to any one of a plurality of selectable positions as determined by actuation of a selected switch means.

5. A camera mount apparatus comprising; a camera receiving and holding cradle mounted on fixed structure for rotatable movement about an axis; a motor for rotating said cradle; a plurality of switches for controlling the energization of said motor secured to said fixed structure adjacent said cradle; a cam on said cradle for actuating said switches as said cradle is rotated by said motor; and a plurality of control switches located at a point remote from said cradle, each of said control switches being operatively associated with said first mentioned switches to control the direction and degree of rotation of said cradle to rotate said cradle to a predetermined position with respect to said axis, each of said control switches causing said cradle to be rotated to a different predetermined position about the axis.

6. The device of claim 5 and means operatively associated with said first mentioned switches for locking said cradle in each of said predetermined positions.

7. In the device of claim 5, a solenoid mounted on said cradle and having a plunger for co-acting with said fixed structure to lock said cradle in said predetermined positions, said solenoid being operatively associated with said control switches and being energized to unlock said cradle for rotary movement each time one of said control switches is actuated to cause rotation of said cradle from one of said predetermined positions to another.

8. A camera mount apparatus for an electrically energized camera comprising: a camera receiving and holding cradle mounted on fixed structure for rotatable movement about an axis; a motor for rotating said cradle; a plurality of switches for controlling the energization of said motor secured to said fixed structure adjacent said cradle; a cam on said cradle for actuating said switches as said cradle is rotated about said axis; a plurality of control switches located at a point remote from said cradle, each of said control switches being operatively associated with said first mentioned switches to control the direction and degree of rotation of said cradle to rotate said cradle to a predetermined position with respect to said axis, each of said control switches causing said cradle to be rotated to a different predetermined position about said axis; a plurality of camera control switches on said fixed structure operatively associated with said camera for preventing energization of said camera unless said cradle is in a selected one of said predetermined positions; and means on said cam for selectively actuating said camera control switches when said cradle is rotated to said predetermined position to permit energization of said camera.

9. The device of claim 8 and means operatively associated with said first mentioned switches for locking said cradle in each of said predetermined positions.

10. The device of claim 8 and a solenoid mounted on said cradle and having a plunger for co-acting with said fixed structure to lock said cradle in said predetermined positions, said solenoid being operatively associated with said control switches and being energized to unlock said cradle for rotary movement each time one of said control switches is actuated to cause rotation of said cradle from one of said predetermined positions to another.

RICHARD C. HORNE.
MORRIS E. ROTH.
FRED N. DICKERMAN.

REFERENCES CITED

The following references are of record in the file of this patent:

UNITED STATES PATENTS

| Number | Name | Date |
|---|---|---|
| 1,829,142 | Hyden | Oct. 27, 1931 |
| 1,845,551 | Mitzl | Feb. 16, 1932 |
| 2,415,563 | Nash | Feb. 11, 1947 |
| 2,474,841 | Hatfield | July 5, 1949 |

FOREIGN PATENTS

| Number | Country | Date |
|---|---|---|
| 459,337 | Great Britain | Jan. 6, 1937 |
| 829,491 | France | Apr. 5, 1938 |